(12) United States Patent
Narikawa et al.

(10) Patent No.: US 10,057,554 B2
(45) Date of Patent: Aug. 21, 2018

(54) PROJECTION CONTROL DEVICE, PROJECTION CONTROL METHOD AND NON-TRANSITORY STORAGE MEDIUM

(71) Applicant: CASIO COMPUTER CO., LTD., Tokyo (JP)

(72) Inventors: Tetsuro Narikawa, Hamura (JP); Toru Takahama, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/798,830

(22) Filed: Oct. 31, 2017

(65) Prior Publication Data

US 2018/0184058 A1    Jun. 28, 2018

(30) Foreign Application Priority Data

Dec. 22, 2016   (JP) ................. 2016-248653

(51) Int. Cl.
   *H04N 9/31* (2006.01)
   *H04N 17/00* (2006.01)

(52) U.S. Cl.
   CPC ......... *H04N 9/3182* (2013.01); *H04N 9/3194* (2013.01)

(58) Field of Classification Search
   CPC ...... H04N 9/3182; H04N 9/3194; H04N 9/31; H04N 5/74; H04N 9/3179; H04N 9/3185; H04N 17/00; H04N 17/02

USPC ..................... 348/739, 744, 180; 353/30, 28
See application file for complete search history.

(56) References Cited

U.S. PATENT DOCUMENTS

| 9,554,104 B2 | 1/2017 | Fuchikami |
| 9,807,356 B1 * | 10/2017 | Minami ............... H04N 9/3155 |
| 9,832,436 B1 * | 11/2017 | Fuchikami ............... G06T 7/60 |
| 2016/0088275 A1 | 3/2016 | Fuchikami |

FOREIGN PATENT DOCUMENTS

JP      2015-173431 A    10/2015

* cited by examiner

*Primary Examiner* — Sherrie Hsia
(74) *Attorney, Agent, or Firm* — Fitch, Even, Tabin & Flannery LLP

(57) ABSTRACT

A projection control device comprises a projection control unit, an image acquisition unit, and a corresponding determination unit. The projection control unit outputs a synthesis pattern light to a screen. The synthesis pattern light comprises plurality of pattern light including light area of different wave range from each other. The image acquisition unit acquires a captured image includes the synthesis pattern light which has been outputted to the screen, wherein the captured image is captured by an image capture unit. The corresponding determination unit determines a relationship between projection pixels of the projector and pixels of the captured image of the image capture unit, on the basis of the synthesis pattern light on the captured image.

12 Claims, 4 Drawing Sheets

PROJECTION CONTROL DEVICE, PROJECTION CONTROL METHOD AND NON-TRANSITORY STORAGE MEDIUM

CROSS-REFERENCE TO RELATED APPLICATIONS

The present application claims the priority to Japanese patent application No. 2016-248653 filed on Dec. 22, 2016, the entire contents of which are incorporated herein by reference.

BACKGROUND

Technical Field

The present disclosure relates to a projection control device, a projection control method, and a storage medium.

Related Art

From the related art, in a projector, there is a technology in which a relationship between projection pixels of the projector and pixels of a captured image of an image capture unit capturing a screen is determined, and a projection image is corrected and outputted on the basis of the relationship such that the projection is suitably performed even in a case where the screen is a curved surface (for example, refer to JP 2015-173431 A).

In an example of the technology of determining the relationship as disclosed in JP 2015-173431 A, pattern light of a gray code formed of a bright portion and a dark portion is outputted and captured, and a relationship between pixels of the captured image and projection pixels is determined by binary searching on the basis of the pattern light on the image captured unit. In this case, in a case where the number of pixels in a horizontal direction is set to X, and the number of pixels in a vertical direction is set to Y, the projection and the photographing of log 2X+log 2Y times are required, and there is a problem that it takes time for performing the photographing and the projection as the number of pixels increases.

SUMMARY

A projection control device according to a first aspect comprises a hardware processor. The hardware processor configured to; perform a projector to output a synthesis pattern light to a screen, wherein the synthesis pattern light comprising plurality of pattern light including light area of different wave range from each other; acquire a captured image includes the synthesis pattern light which has been outputted to the screen, wherein the captured image is captured by an image capture unit; and determine a relationship between projection pixels of the projector and pixels of the captured image of the image capture unit, on the basis of the synthesis pattern light on the captured image.

A projection control method according to a second aspect comprises: causing a projector to output synthesis pattern light to a screen, wherein the synthesis pattern light comprises plurality of pattern light including a light area of different wave range from each other; acquiring a captured image including the synthesis pattern light which has been outputted to the screen, wherein the captured image is captured by an image capture unit; and determining a relationship between projection pixels of the projector and pixels of the captured image of the image capture unit, on the basis of the synthesis pattern light on the captured image.

A non-transitory storage medium according to a third aspect is encoded with a computer-readable program that enables a computer to execute functions as: causing a projector to output synthesis pattern light to a screen, wherein the synthesis pattern light comprises plurality of pattern light including a light area of different wave range from each other; acquiring a captured image including the synthesis pattern light which has been outputted to the screen, wherein the captured image is captured by an image capture unit; and determining a relationship between projection pixels of the projector and pixels of the captured image of the image capture unit, on the basis of the synthesis pattern light on the captured image.

According to the present disclosure, it is possible to quickly determine a relationship between projection pixels of a projector to be outputted to a screen and photographing pixels of a photographing device photographing the screen.

DETAILED DESCRIPTION

Hereinafter, an embodiment of the present disclosure will be described with reference to the drawings.

Figure 1:
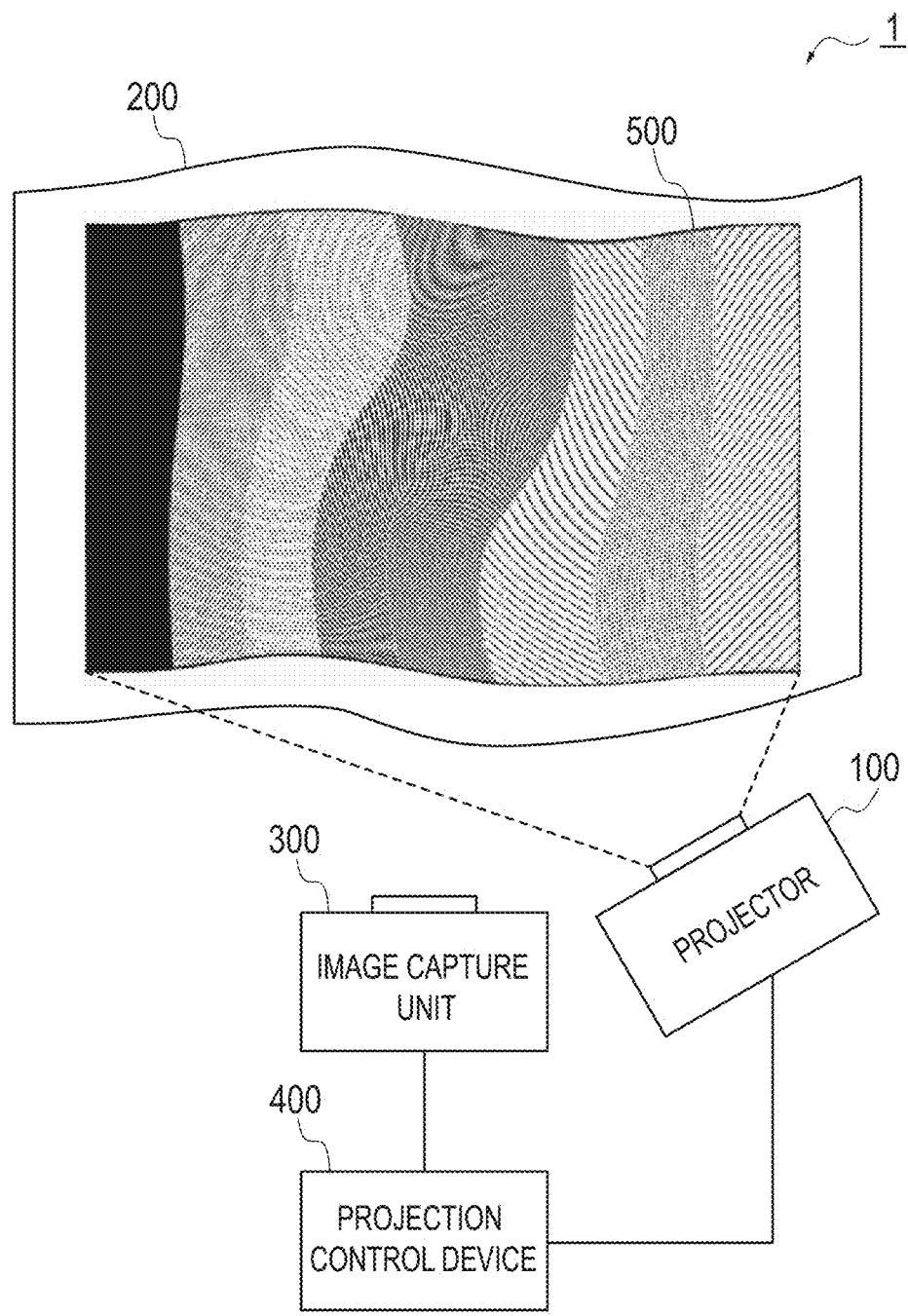
FIG. 1 is a diagram illustrating an appearance configuration of a projection control system according to Embodiment 1 of the present disclosure.

FIG. 1 is a diagram illustrating an appearance configuration of a projection control system 1 according to an embodiment of the present disclosure. The projection control system 1 is configured of a projector 100, a screen 200, an image capture unit 300, and a projection control device 400.

The projector 100 is a device outputting the contents to the screen 200, and is configured of a projector including a projection lens, a projection element, a light source, and the like. The projector 100 acquires the contents stored in an external storage device (not illustrated) through the projection control device 400, and outputs the contents to the screen 200.

The screen 200 is a surface to which an image or a video projected by the projector 100 is outputted. The screen 200, for example, is a building wall or a screen. In this embodiment, synthesis pattern light 500 as illustrated in FIG. 1 is outputted to the screen 200.

The image capture unit 300 is configured of a camera including an image sensor such as charge coupled device (CCD) or a complementary metal oxide semiconductor (CMOS). The image capture unit 300 acquires the captured image of the screen 200, and outputs the image to the projection control device 400.

The projection control device 400 is connected to the projector 100 and the image capture unit 300 to be communicated in a wired or wireless manner, and outputs the contents to be projected by the projector 100 to the projector 100. In addition, in this embodiment, the projection control device 400 outputs the synthesis pattern light 500 to the screen 200, and determines a relationship between pixels of the captured image of the image capture unit 300 and projection pixels of the projector 100 on the basis of the captured image of the synthesis pattern light 500 which is captured by the image capture unit 300. That is, it is determined which pixel of the projector 100 is reflected on which pixel of the image capture unit 300. Then, the projection control device 400 corrects the contents on the basis of the determined relationship, and outputs the contents to the projector 100.

Next, the configuration of the projection control device 400 will be described.

Figure 2:
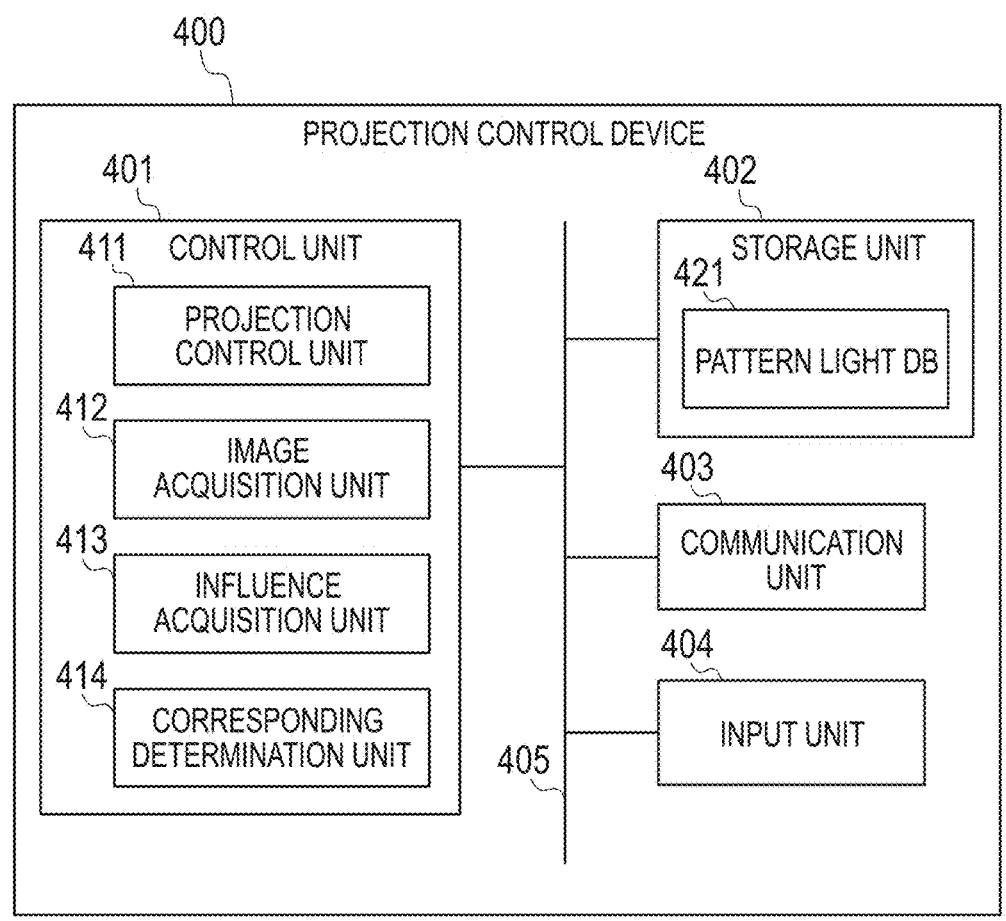
FIG. 2 is a schematic view illustrating a configuration of a projection control device according to the embodiment.

FIG. 2 is a schematic view illustrating the configuration of the projection control device 400. As illustrated in FIG. 2, the projection control device 400 is configured of a control unit 401, a storage unit 402, a communication unit 403, and an input unit 404, and the units are connected to each other through a bus 405.

The control unit 401 is configured of a central processing unit (CPU), a read only memory (ROM), and a random access memory (RAM). The control unit 401 executes a program stored in the ROM (for example, a program according to corresponding determination processing described below), and thus, realizes functions of a projection control unit 411, an image acquisition unit 412, an influence acquisition unit 413, and a corresponding determination unit 414 described below.

The storage unit 402 is a non-volatile memory such as a hard disk drive (HDD). In this embodiment, the storage unit 402 stores a pattern light database (DB) 421.

The communication unit 403 is configured of a communication interface for connecting the projection control device 400 to the projector 100 and the image capture unit 300 to be communicated.

The input unit 404 is configured of an input device such as a button, a keyboard, and a touch panel. The input unit 404 receives an operation input of a user of the projection control device 400, and outputs a signal corresponding to the received operation input to the control unit 401.

Next, the synthesis pattern light 500 stored in the pattern light DB 421 by the storage unit 402 will be described. The synthesis pattern light 500 is pattern light in which plurality of monochromic pattern light having a light area of different wave range each other are synthesized. Hereinafter, a generating method of the synthesis pattern light 500 will be described by using FIG. 3. In synthesis pattern light 500_1 illustrated in FIG. 3 as an example, three monochromic pattern light 510_1, 510_2, and 510_3 including a light area of red, green, and blue (RGB) as an example of the different wave range each other are synthesized. Here, in the monochromic pattern light 510_1, 510_2, and 510_3, a bright portion which extends in a vertical direction and has brightness of greater than or equal to a predetermined value is applied to the light area of the wave range of RGB each other in pattern light used for space coding of a gray code of three bits in a horizontal direction. The monochromic pattern light 510_1 includes a light area 511_1 of a wave range corresponding to red, and a dark portion 511_2 of which brightness is less than a predetermined value. The monochromic pattern light 510_2 includes a light area 511_2 of a wave range corresponding to green, and a dark portion 512_2. The monochromic pattern light 510_3 includes a light area 511_3 of a wave range corresponding to blue, and a dark portion 512_3. Accordingly, the synthesis pattern light 500_1 obtained by synthesizing the monochromic pattern light 510_1, 510_2, and 510_3 includes the light area 501_1 of the wave range corresponding to red, a light area 502_1 of a wave range corresponding to magenta, a light area 503_1 of a wave range corresponding to white, a light area 504_1 of a wave range corresponding to yellow, the light area 505_1 of the wave range corresponding to green, a light area 506_1 of a wave range corresponding to cyan, the light area 507_1 of the wave range corresponding to blue, and a dark portion 508_1.

Figure 3:
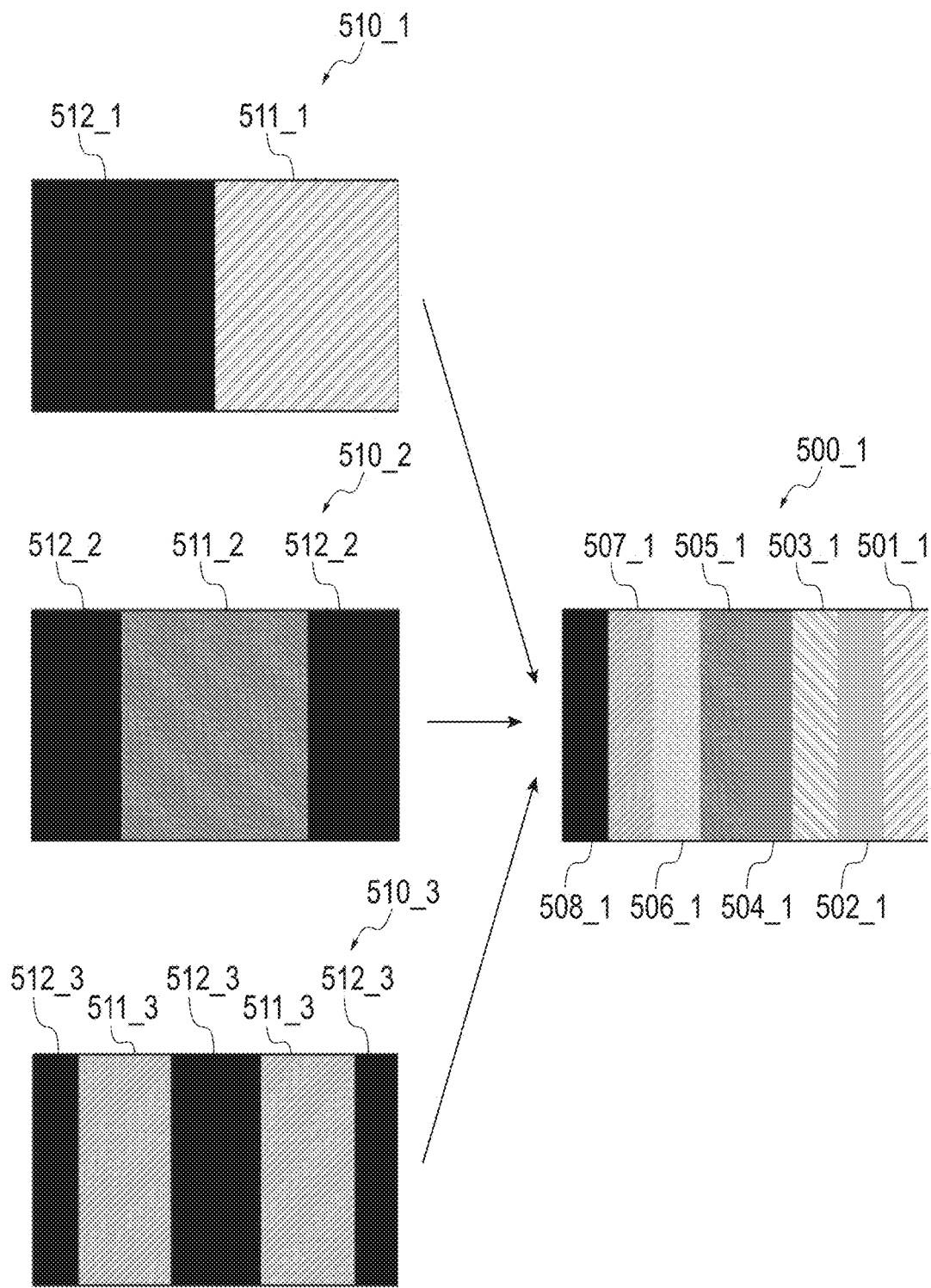
FIG. 3 is a diagram illustrating an example of a generating method of synthesis pattern light.

The synthesis pattern light 500_1 illustrated in FIG. 3 is the synthesis pattern light used for space coding of the gray code of three bits in the horizontal direction, and the pattern light DB 421 stores the synthesis pattern light 500 of which the number accords to the number of bits required for space coding. For example, in a case of determining a relationship between the projection pixels of the projector 100 and the pixels of the captured image of the image capture unit 300 in which the number of pixels in the horizontal direction is X, and the number of pixels in the vertical direction is Y, monochromic pattern light of log 2X which is used for space coding of a gray code of log 2X bits in the horizontal direction, and monochromic pattern light of log 2Y which is sued for space coding of a gray code of log 2Y bits in the vertical direction are required. Then, in a case where such monochromic pattern light include the light area of any one wave range of RGB each other, three monochromic pattern light including the light area of different wave range each other are synthesized, and thus, synthesis pattern light 500 of (log 2X+log 2Y)/3 are generated. Accordingly, the pattern light DB 421 stores the synthesis pattern light 500 of (log 2X+log 2Y)/3 in advance.

Next, a functional configuration of the control unit 401 of the projection control device 400 will be described. As illustrated in FIG. 2, the control unit 401 functions as the projection control unit 411, the image acquisition unit 412, the influence acquisition unit 413, and the corresponding determination unit 414.

The projection control unit 411 outputs the synthesis pattern light 500 in which the plurality of monochromic pattern light including the light area of the different wave range each other are synthesized to the screen 200 by the projector 100. For example, the projection control unit 411 sequentially outputs the synthesis pattern light 500 stored in the pattern light DB 421 to the projector 100 with reference to the pattern light DB 421, and thus, outputs the synthesis pattern light to the screen. In addition, the projection control unit 411 corrects the contents, which are a projection target image, on the basis of the relationship determined by the corresponding determination unit 414, and outputs the contents to the projector 100.

The image acquisition unit 412 acquires the captured image of the synthesis pattern light 500 outputted to the screen 200, in which the captured image is captured by the image capture unit 300. For example, the image acquisition unit 412 performs the image capture unit 300 to capture the respective synthesis pattern light 500 which are outputted according to a timing where the synthesis pattern light 500 is sequentially outputted by the projector 100. Then, the image acquisition unit 412 acquires the captured image of the respective synthesis pattern light 500, in which the captured image is captured by the image capture unit 300, from the image capture unit 300.

The influence acquisition unit 413 acquires influence information representing an influence rate of the light of the different wave range each other with respect to the captured image on the basis of a wave range image obtained by capturing the screen 200 to which the light of the different wave range each other is outputted by the projector 100 with the image capture unit 300. In general, in a case where a projection image which is outputted to the screen 200 by the projector 100 is captured by the image capture unit 300, it is known that a deviation in RGB values occurs between the projection image and the captured imaged due to an influence such as a noise. That is, for example, in a case where the projector 100 outputs a projection image having RGB values of (255, 0, and 0) to the screen 200, there is a case where a captured image obtained by capturing the projection image includes a G component or a B component which is not included in the projection image. Accordingly, in this embodiment, the influence acquisition unit 413 acquires the rate of the influence that each of the components of RGB receives from the other component in advance, eliminates the influence from the captured image of the synthesis pattern light 500 on the basis of the rate acquired by the corresponding determination unit 414, and performs color conversion with respect to the captured image to the projection image, and thus, it is possible to increase the independence of a gray code of RGB.

Hereinafter, an example of an acquiring method of the influence information of the influence acquisition unit 413 will be described. For example, in a case where the synthesis pattern light 500 is generated by synthesizing three monochromatic pattern light including a light area of a wave range of RGB, the influence acquisition unit 413 outputs each light of RGB to the screen 200 by the projector 100. Then, the influence acquisition unit 413 allows the image capture unit 300 to capture the screen 200 to which the light of RGB is outputted, and thus, acquires a wave range image for each of RGB. Then, the influence acquisition unit 413 measures the influence rate of each of the components of RGB of the captured image on the basis of the acquired wave range image for each of RGB. Then, the influence acquisition unit 413 generates a color conversion matrix for performing conversion from a color space of the captured image to a color space of the projection image as the influence information on the basis of the measured influence rate.

The corresponding determination unit 414 determines the relationship between the projection pixels of the projector 100 and the pixels of the captured image of the image capture unit 300 on the basis of the synthesis pattern light 500 on the captured image. For example, the corresponding determination unit 414 corrects the color space of the projector 100 with respect to each of the captured images of the synthesis pattern light 500 which is acquired by the image acquisition unit 412, by using the color conversion matrix generated by the influence acquisition unit 413. Then, the corresponding determination unit 414 performs binarization of the corrected captured image with respect to each of RGB, and acquires a pattern light image corresponding to three gray codes of one captured image. Then, the corresponding determination unit 414 decodes the gray code represented by the acquired pattern light image and performs coordinate calculation, and thus, determines the relationship between the projection pixels of the projector 100 and the pixels of the captured image of the image capture unit 300.

Figure 4:
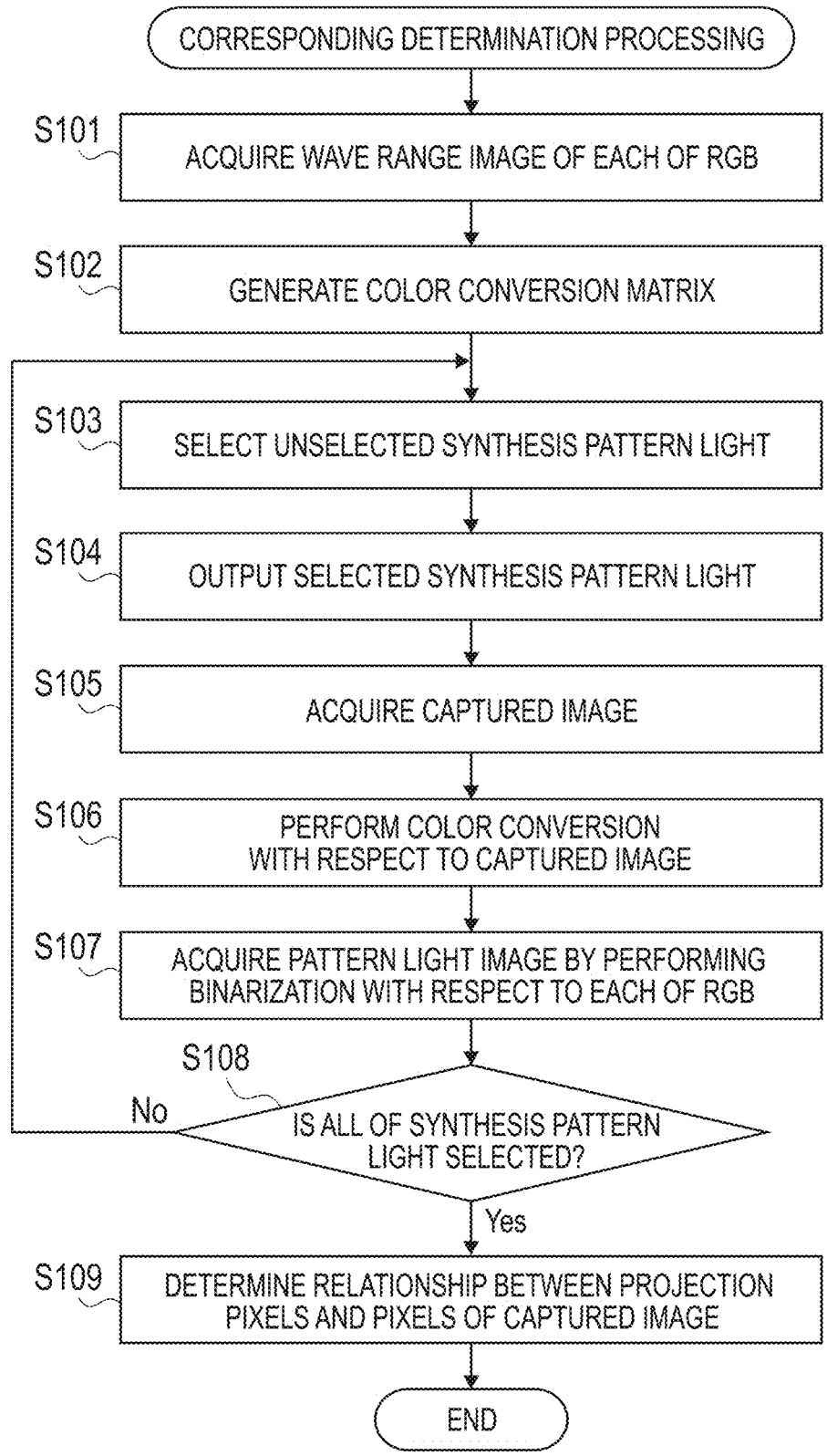
FIG. 4 is a diagram illustrating an example of a flowchart of corresponding determination processing according to the embodiment.

Next, the corresponding determination processing which is executed by the control unit 401 of the projection control device 400 according to this embodiment will be described. FIG. 4 is an example of a flowchart of the corresponding determination processing according to this embodiment. The corresponding determination processing, for example, is started by receiving an operation input instructing this processing to be started through the input unit 404.

First, the influence acquisition unit 413 allows the projector 100 to output the light of each of RGB to the screen 200, and allows the image capture unit 300 to capture the screen 200, and thus, acquires the wave range image of each of RGB (Step S101).

Next, the influence acquisition unit 413 generates the color conversion matrix for performing the conversion from the color space of the captured image to the color space of the projection image on the basis of the wave range image acquired in Step S101 (Step S102).

Then, the projection control unit 411 selects one synthesis pattern light 500 which has not been selected yet, among the synthesis pattern light 500 stored in the pattern light DB 421 (Step S103).

Then, the projection control unit 411 outputs the synthesis pattern light 500 selected in Step S103 to the projector 100 to be outputted to the screen 200 (Step S104).

The image acquisition unit 412 allows the image capture unit 300 to capture the synthesis pattern light 500 which is outputted to the screen 200 in Step S104, and acquires the captured image (Step S105).

Next, the corresponding determination unit 414 performs the color conversion with respect to the captured image acquired in Step S105 by using the color conversion matrix generated in Step S102 (Step S106)

Then, the corresponding determination unit 414 performs the binarization of the captured image, which is subjected to the color conversion in Step S106, with respect to each of RGB, and acquires the pattern light image (Step S107).

Then, the corresponding determination unit 414 determines whether or not all of the synthesis pattern light 500 stored in the pattern light DB 421 are selected (Step S108). In a case where it is determined that all of the synthesis pattern light are not selected (Step S108; No), the corresponding determination unit 414 returns to Step S103, and repeats the subsequent processing. In addition, in a case where it is determined that all of the synthesis pattern light 500 are selected (Step S108; Yes), the corresponding determination unit 414 decodes the gray code of the acquired pattern light image with respect to all of the synthesis pattern light 500, and performs the coordinate calculation, and thus, determines the relationship between the projection pixels of the projector 100 and the pixels of the captured image of the image capture unit 300 (Step S109). Then, this processing is ended.

As described above, the projection control device 400 according to this embodiment allows the projector 100 to output the synthesis pattern light 500, in which three monochromatic pattern light including the light area of the wave range of each of RGB are synthesized, to the screen 200, and acquires the captured image of the synthesis pattern light 500. Then, the projection control device 400 determines the relationship between the projection pixels of the projector 100 and the pixels of the captured image of the image capture unit 300 on the basis of the synthesis pattern light 500 on the acquired captured image. Accordingly, in the related art, the relationship between the projection pixels of the projector 100 and the pixels of the captured image of the image capture unit 300 is determined by projecting and capturing the pattern light of the gray codes of log 2X+log 2Y, but the projection control device 400 performs the projection and the capturing of the synthesis pattern light 500 by ⅓ pattern light of the pattern light of the gray codes of log 2X+log 2Y, and thus, it is possible to quickly determine the relationship.

In addition, the projection control device 400 projects and captures the synthesis pattern light 500 in which the monochromatic pattern light including an area disposed on the basis of the gray code is synthesized. Accordingly, in the gray code, a Hamming distance between the adjacent values is 1, and thus, it is possible to minimize encoding error on the boundary.

In addition, the projection control device 400 correct the captured image by the color conversion matrix for performing the conversion from the color space of the captured image to the color space of the projection image with respect to each of RGB, before the captured image unit is subjected to the binarization with respect to each of RGB. For this reason, it is possible to increase the independence of the gray code of RGB by decreasing an influence such as a noise, and to accurately determine the relationship between the projection pixels of the projector 100 and the pixels of the captured image of the image capture unit 300.

The embodiment has been described, but the embodiment described above is an example, the specific configuration of the projection control device 400, the contents of the output control processing, or the like is not limited to the embodiment described above, and modifications described below can be performed.

For example, in the embodiment described above, an example has been described in which the synthesis pattern light 500 is generated by synthesizing three monochromic pattern light including the light area of the wave range of RGB. However, the light area included in the monochromic pattern light is not limited to the wave range of RGB, and may be other wave ranges which can be sufficiently separated. In addition, the light area included in the monochromic pattern light is not limited to the wave range of visible light, and for example, may be a wave range of an infrared ray.

In addition, in the embodiment described above, in FIG. 3, an example has been described in which the synthesis pattern light 500_1 is generated by synthesizing the monochromic pattern light 510_1 to 510_3 including the light area extending in the vertical direction for space coding of the gray code in the horizontal direction. However, the generating method of the synthesis pattern light 500_1 is not limited thereto. For example, the synthesis pattern light 500 may be generated by synthesizing the monochromic pattern light including the light area extending in the vertical direction for space coding of the gray code in the horizontal direction, and the monochromic pattern light including the light area extending in the horizontal direction for space coding of the gray code in the vertical direction. It is possible to generate the synthesis pattern light 500 by synthesizing any combination of monochromic pattern light insofar as the wave ranges of the light areas included in the plurality of synthesized monochromic pattern light are different from each other.

In addition, in the embodiment described above, an example has been described in which the synthesis pattern light 500 is generated by synthesizing the monochromic pattern light on the basis of the binary gray code. However, the monochromic pattern light is not limited to the monochromic pattern light based on the binary gray code, and for example, monochromic pattern light based on a ternary gray code or a quaternary gray code may be used.

In addition, the projection control device 400 according to the present disclosure can be realized by a general computer, but not by a dedicated device. For example, the projection control device 400 may be realized by allowing the computer to execute a program. The program for realizing the function of the projection control device 400 may be stored in a computer readable storage medium, such as a universal serial bus (USB) memory, a compact disc read only memory (CD-ROM), a digital versatile disc (DVD), and a HDD, or may be downloaded to the computer through a network.

As described above, a preferred embodiment of the present disclosure has been described, but the present disclosure is not limited to a specific embodiment, and the present disclosure includes the equivalent scope to the claims. Hereinafter, the disclosure described in the claims of the present application will be noted.

What is claimed is:

1. A projection control device comprising a hardware processor;
   wherein the hardware processor configured to;
   perform a projector to output a synthesis pattern light to a screen, wherein the synthesis pattern light comprising plurality of pattern light including light area of different wave range from each other;
   acquire a captured image includes the synthesis pattern light which has been outputted to the screen, wherein the captured image is captured by an image capture unit; and
   determine a relationship between projection pixels of the projector and pixels of the captured image of the image capture unit, on the basis of the synthesis pattern light on the captured image.

2. The projection control device according to claim 1, wherein the plurality of pattern light are three pattern light including a light area of a monochromic wave range of each of RGB.

3. The projection control device according to claim 1, wherein the plurality of pattern light include the respective areas disposed on the basis of a gray code.

4. The projection control device according to claim 1, wherein the plurality of pattern light include the respective areas extending in a predetermined direction.

5. The projection control device according to claim 1, wherein the plurality of pattern light comprises at least pattern light including the area extending in a predetermined direction and pattern light including the area extending in a direction orthogonal to the predetermined direction.

6. The projection control device according to claim 1, wherein the hardware processor is configured to correct a projection target image to be outputted to the projector, on the basis of the determined relationship.

7. The projection control device according to claim 1, wherein the hardware processor is configured to:
   acquire influence information representing an influence rate of the light of the different wave range from each other with respect to the captured image, on the basis of a wave range image obtained by capturing the screen to which the light of the different wave range from each other is outputted by the projector with the image capture unit; and
   determine a relationship between the projection pixels of the projector and pixels of the captured image of the image capture unit on the basis of the synthesis pattern light on the captured image which is corrected on the basis of the influence information.

8. The projection control device according to claim 7, wherein the plurality of pattern light are three pattern light including a light area of a monochromic wave range of each of RGB.

9. The projection control device according to claim 1, wherein the hardware processor is configured to:
   determine a relationship between wavelengths of the projector and the image capture unit;

perform the projector to output the light of the different wave range from each other to the screen;

capture the light of the different wave range from each other which has been outputted to the screen wherein the light of the different wave range from each other is captured by the image capture unit; and determine the relationship between the wavelengths of the projector and the image capture unit, on the basis of the light of the different wave range from each other which is outputted by the projector, and the light of the different wave range from each other which is captured by the image capture unit.

10. The projection control device according to claim 9, wherein the plurality of pattern light are three pattern light including a light area of a monochromic wave range of each of RGB.

11. A projection control method comprising:

causing a projector to output synthesis pattern light to a screen, wherein the synthesis pattern light comprises plurality of pattern light including a light area of different wave range from each other;

acquiring a captured image including the synthesis pattern light which has been outputted to the screen, wherein the captured image is captured by an image capture unit; and determining a relationship between projection pixels of the projector and pixels of the captured image of the image capture unit, on the basis of the synthesis pattern light on the captured image.

12. A non-transitory storage medium encoded with a computer-readable program that enables a computer to execute functions as:

causing a projector to output synthesis pattern light to a screen, wherein the synthesis pattern light comprises plurality of pattern light including a light area of different wave range from each other;

acquiring a captured image including the synthesis pattern light which has been outputted to the screen, wherein the captured image is captured by an image capture unit; and determining a relationship between projection pixels of the projector and pixels of the captured image of the image capture unit, on the basis of the synthesis pattern light on the captured image.

* * * * *